(12) United States Patent
Burge

(10) Patent No.: US 6,174,341 B1
(45) Date of Patent: Jan. 16, 2001

(54) CEILING MOUNTED AIR FILTRATION SYSTEM

(76) Inventor: Byron Burge, 7504 Fegenbush La., C-1, Louisville, KY (US) 40228

(*) Notice: Under 35 U.S.C. 154(b), the term of this patent shall be extended for 0 days.

(21) Appl. No.: 09/271,804

(22) Filed: Mar. 18, 1999

(51) Int. Cl.[7] .......................... B01D 29/52; B01D 29/56
(52) U.S. Cl. .......................... 55/385.2; 55/467; 55/484; 55/486; 454/187
(58) Field of Search ................... 55/385.2, 467, 55/484, 486; 454/187

(56) References Cited

U.S. PATENT DOCUMENTS

| | | |
|---|---|---|
| 4,506,595 | 3/1985 | Roberts et al. . |
| 4,530,272 | 7/1985 | Stokes . |
| 4,658,707 | 4/1987 | Hawkins et al. . |
| 4,693,175 * | 9/1987 | Hashimoto .......................... 55/385.2 |
| 4,721,031 | 1/1988 | Nakata et al. . |
| 4,955,997 | 9/1990 | Robertson, III . |
| 4,961,764 * | 10/1990 | Develle et al. ...................... 55/385.2 |
| 5,236,476 | 8/1993 | Klick . |
| 5,531,641 | 7/1996 | Aldrich . |
| 5,690,719 | 11/1997 | Hodge . |
| 5,733,190 | 3/1998 | Wahab . |

* cited by examiner

Primary Examiner—David A. Simmons
Assistant Examiner—Robert A. Hopkins
(74) Attorney, Agent, or Firm—Charles G. Lamb; Middleton Reutlinger

(57) ABSTRACT

An air filtration system includes a housing with a blower therein having at least one inlet in flow communication with at least one ceiling mounted filter assembly and at least one ceiling mounted return air outlet in a preselected location in a ceiling. Preferably, the at least one filter assembly is located along a center line running from one end of the ceiling to an opposed second end and the return air outlet is mounted at a preselected location along a side of the ceiling.

7 Claims, 3 Drawing Sheets

US 6,174,341 B1

CEILING MOUNTED AIR FILTRATION SYSTEM

BACKGROUND OF THE INVENTION

The present invention relates to a ceiling mounted air filtration system for use in areas having high concentrations of smoke and odor. More particularly, the present invention relates to ceiling mounted air filtration systems which includes a plurality of filter assemblies located at each return air inlet in a ceiling.

Ceiling mounted air filtration systems are well known in the art for cleaning air in a room and returning or recycling the cleaned air back into the room. For example, U.S. Pat. No. 4,955,997 teaches a flush mounted ceiling air cleaner which includes a cabinet with an enclosed blower and a plurality of filters where the inlet into the cabinet is in flow communication with supplied air from the room and the outlet from the cabinet is in flow communication with return air into a room. All of the filters in the air cleaning system are disposed within the cabinet.

SUMMARY OF THE INVENTION

The present invention provides a ceiling mounted air filtration system for use in removing heavy concentrations of smoke and odor in a confined environment.

The present invention further provides an air cleaning system which includes a blower which is remote from and in flow communication with a plurality of supply air inlets and a plurality of return air outlets which are disposed flush in a ceiling.

The present invention also provides an air filtration system including a plurality of filter assemblies wherein each filter assembly is mounted within the ceiling at each supply air inlet into the air filtration system.

The present invention even further provides an air filtration system including a plurality of filter assemblies including at least two filters at each air inlet grill or grid, the grills being flush mounted in a ceiling.

More particularly, the present invention provides a ceiling mounted air filtration system comprising: a housing having a blower therein, said housing having at least one air inlet and at least one air outlet; at least one filter assembly mounted in said ceiling, said at least one filter assembly being in flow communication with said at least one air inlet to said housing; and, at least one outlet grill mounted in said ceiling and being remote from and in flow communication with said at least one air outlet.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
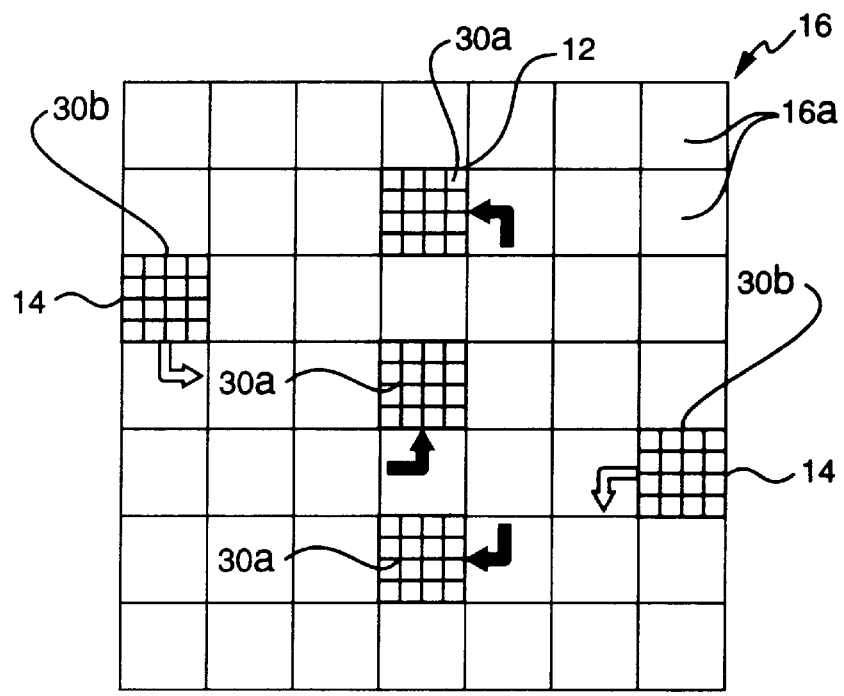
FIG. 1 is a bottom view of a ceiling showing typical dirty air inlets and clean air outlet returns in an air filtration system of the present invention.
Figure 2:
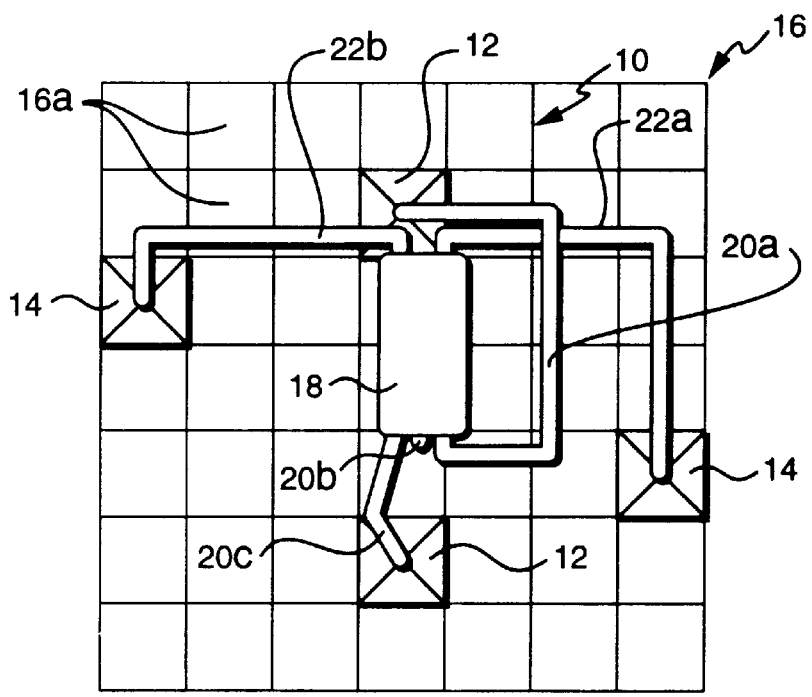
FIG. 2 is a top view of a ceiling with a lay out of an air filtration system of the present invention of FIG. 1.

With reference to FIGS. 1 and 2, there is shown a ceiling mounted air filtration system denoted generally by the numeral 10. The ceiling 16, in a preferred embodiment, is composed of a plurality of ceiling grids 16a which are generally in sections of 2'×2' and rest in place upon a network of supports (not shown) which extend longitudinally and transversely of the ceiling at 2' intervals. The air filtration system 10 is provided with a housing 18 for a blower 18a which is commercially available and well known in the art. The housing 18 is mounted above ceiling 16 and is generally located in the center portion of the ceiling 16 but may be positioned away from the ceiling depending upon the amount of spacing above the ceiling in which the blower 18a is to be placed and other considerations. In fact, the housing 18 may be placed in a room separate from the room including the ceiling 16.

Figure 4A:
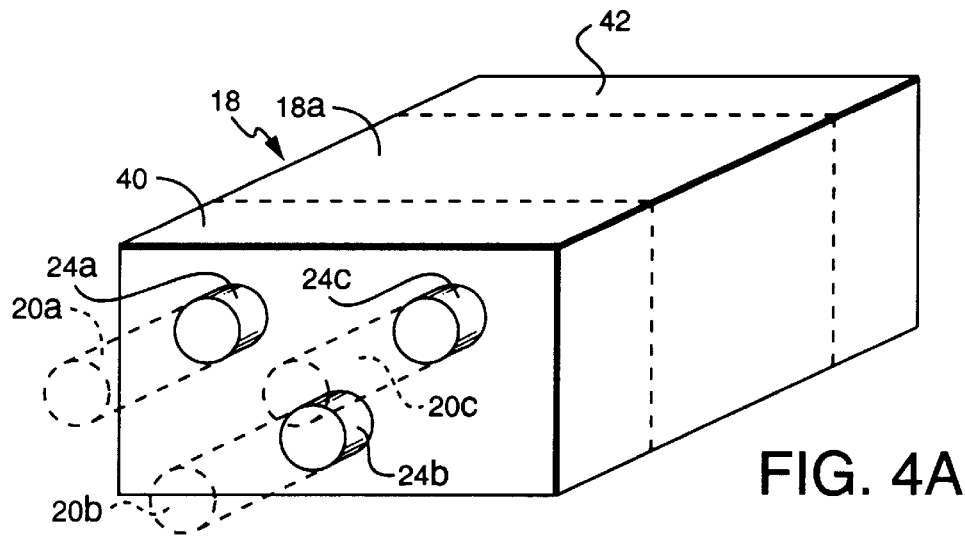
FIG. 4A is a perspective view of an inlet end of a housing for a blower of the present invention with selected portions shown in dotted lines.

Housing 18 is provided with at least one inlet which is in flow communication with at least one filter assembly 12. As shown in FIGS. 1, 2, and 4A there are three filter assemblies 12 in flow communication with housing air inlets 24a, 24b, 24c through inlet air conduits 20a, 20b, 20c, respectively. The filter assemblies 12 are located at preselected positions in the ceiling 16 and are generally spaced along a center-line of a room. As best shown in FIG. 1 the filter assemblies 12 include an air inlet grill 30a of a surface area generally equal to or less than the surface area of a 2'×2' ceiling grid 16a. And, air inlet grills 30a are generally flush mounted in ceiling 16.

Figure 4B:
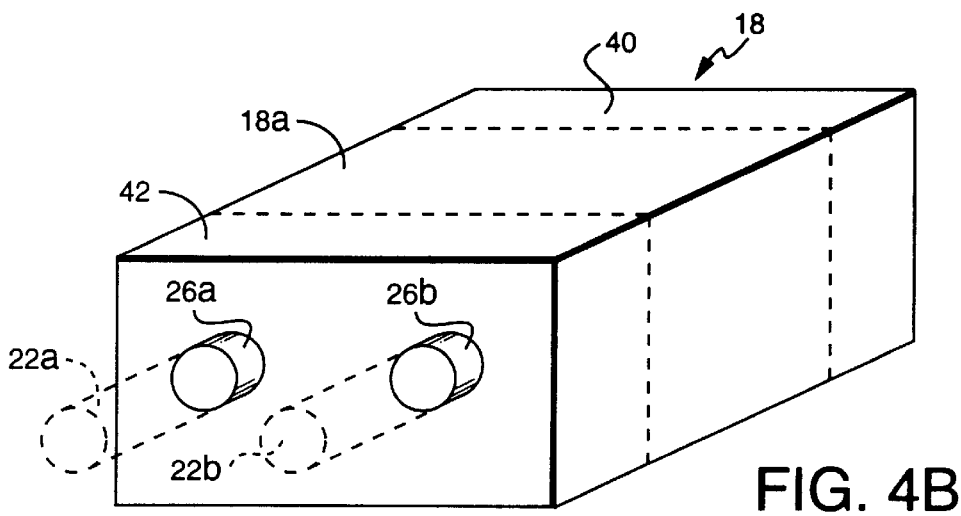
FIG. 4B is a perspective view of an outlet end of the housing of FIG. 4A with selected portions shown in dotted lines.

Referring to FIGS. 2 and 4B, the housing 18 is provided with two air outlets 26a and 26b which are in flow communication with two return air outlets 14 through air outlet ducts 22a and 22b, respectively. As shown in FIG. 1, the return air outlets 14 terminate with a grill 30b which is disposed flush with the ceiling 16 wherein the outlets 14, which provide for the return of clean air into the room, are generally disposed at preselected positions along opposite walls of the room. The size of the outlet grills 30b are generally the same size or they may be less than the surface area of the ceiling grids 16a. Preferably, the return air return outlets 14 are spaced to return air along the outer walls of the room and the dirty air inlets to the filter assemblies 12 are positioned at locations remote from the return air outlets.

Figure 3:
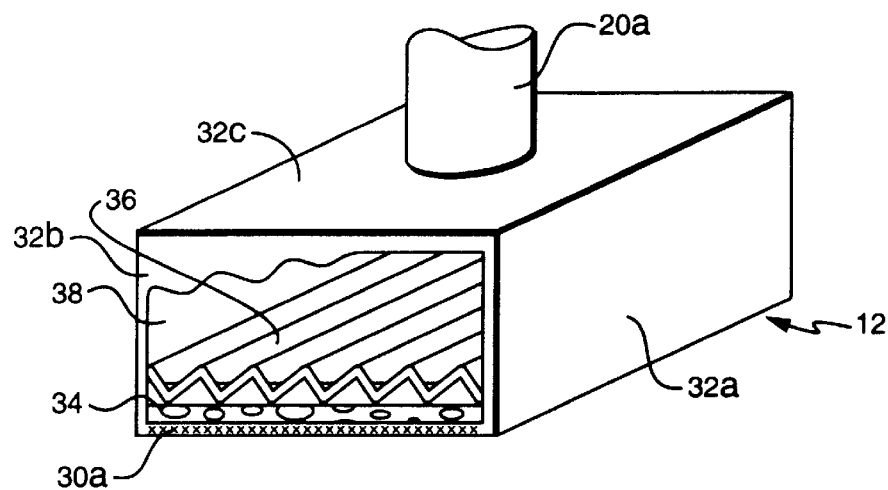
FIG. 3 is an enlarged perspective view of a filter assembly of the present invention used in FIG. 1 with selected portions shown in cut-away.

As shown in FIG. 3, filter assembly 12 includes a housing 12a which encloses the grill 30a, a prefilter 34, a primary filter 36, and a plenum chamber 38 above the filters 34 and 36. Preferably, the prefilter 34 is an activated carbon filter which is well known in the art for the removal of gaseous and odor causing particulates. In a preferred embodiment the activated carbon filter is a two-ply polysynthetic filter. The primary filter 36 is usually a high efficiency particulate filter (HEPA) of sinuous cross-section or mini-pleat construction of fiberglass for the removal of extremely small particulates which are present in the air, particularly, for example, smoke particulates. The prefilter 34 and the primary filter 36 are disposed in series in an air flow arrangement. The filter assembly 12 may be supported in the ceiling by any well known means. Disposed above the primary filter 36 is the plenum chamber 38 which provides for a uniform flow of air across the filters 34, 36 and in turn improves filtration efficiency. A preferred chamber 38 for a 2'×2' filter assembly is generally about 2" in depth.

Referring now to FIGS. 4A and 4B, a housing 18 is provided with a sub-housing 18a for a blower and blower motor. On the inlet side of the sub-housing 18a is a plenum chamber 40 which receives and mixes the incoming filtered air through inlets 24a, 24b, 24c. On the outlet side of sub-housing 18a is another plenum chamber 42 which provides for uniform distribution of high pressure air to outlets 26a, 26b. Plenum chambers 40 and 42 improves blower performance by lowering initial static pressure loads on the blower motor.

Figure 5:
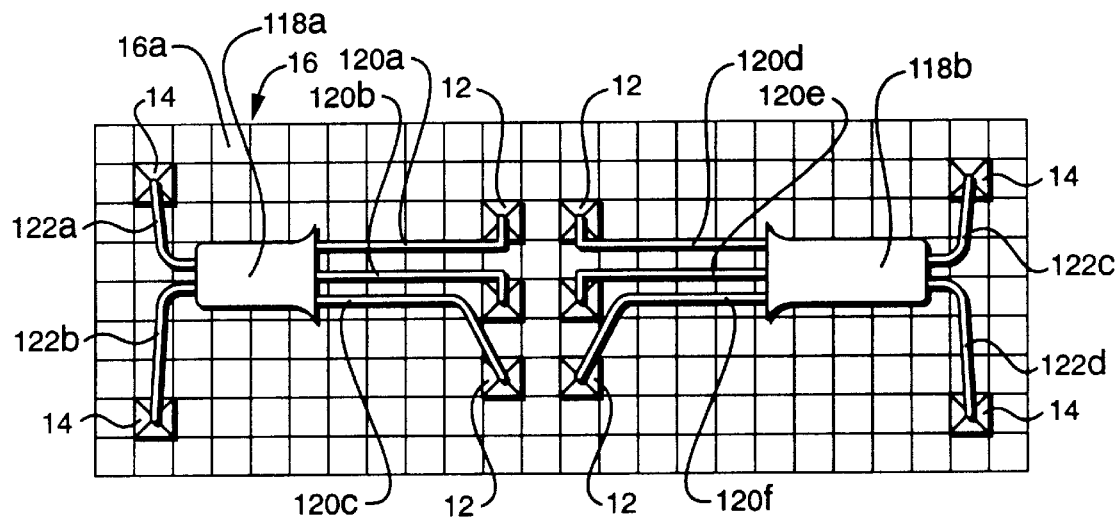
FIG. 5 is a top view of a ceiling with a layout of a second embodiment of the present invention; and, FIG. 6 is a bottom view of a ceiling showing dirty air inlets and clean air outlets of a third embodiment of the present invention.

Referring now to FIG. 5, another embodiment of the present invention is shown wherein two systems are utilized for the cleaning of air in a room. The housing for the blower and motor assembly, on one side of the room, is identified by the numeral 118a and for the other side of the room, is designated by the numeral 118b. Each of the housings 118a and 118b are in flow communication with air outlet grills 14 through conduits 122a, 122b, 122c, 122d and with filter assemblies 12 through outlet conduits 120a, 120b, 120c, 120d, 120e, and 120f. In this arrangement a more efficient filtration system is obtained as the air flow pattern creates a correollis air pattern, that is, there is a negative air pressure down the center of the room or building and a positive pressure towards the outside ceiling near the walls.

Figure 6:
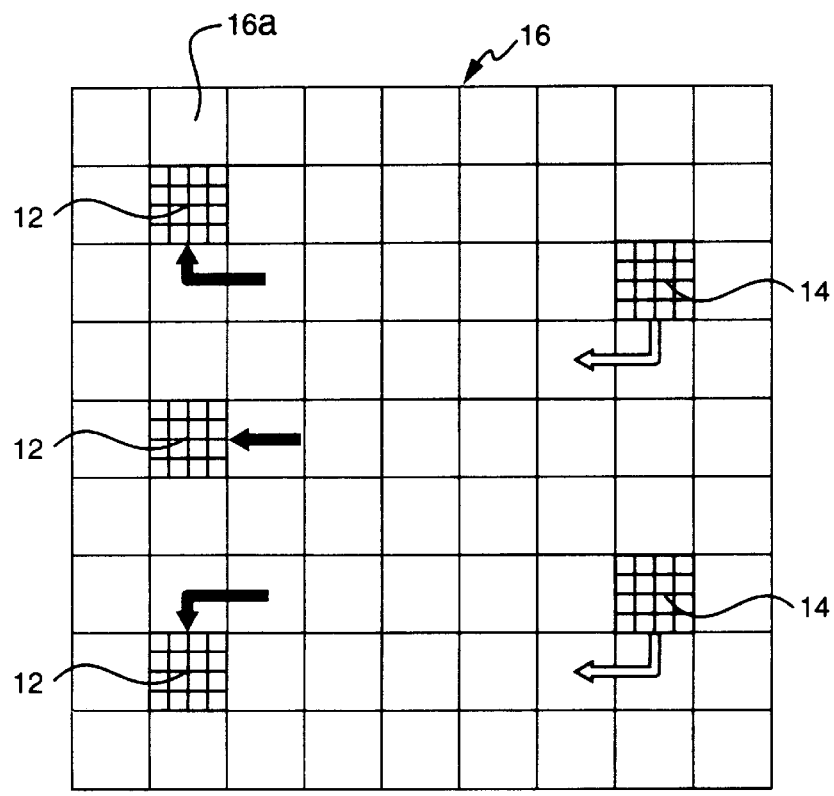

Referring now to FIG. 6, another embodiment of the present invention is shown wherein in a small room or building it may be desired to create an air flow pattern wherein the clean air flows downward along one sidewall of the grids 14 and the dirty air flows upward along an opposed wall upwards into the filter assemblies 12 positioned as shown in FIG. 6.

In the installation of an air filtration system 10 of the present invention, the return or clean air outlet grills, are located along the walls of a room and the dirty air inlet grills are down the center of the room at a sufficient distance so as to create an inside to outside air pressure pattern in the room. This provides not only for an efficient distribution of the air for circulation, but also creates the greatest distance between the clean air entering the room and the dirty air exiting the room. Moreover, even though the preferred embodiment shows a ceiling made up of 2'×2' grids for exemplary purposes, it is realized that the type of ceiling is not critical to the present invention.

The type of blower utilized in the instant invention of the present air filtration system 10 may be any well known in the art and the size of the blower and accompanying motor will depend upon the amount of air to be filtered and recirculated within a given environment. Moreover, the preferred conduits linking the supply filter assemblies 12 to the housing 18 are generally commercially available flexible insulated ducts. Also, the outlet conduits from the housing to the return air grills are also generally flexible insulated ducts.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A filtration system consisting essentially of:
   a housing having a blower therein, said housing having an air inlet and an air outlet;
   a plurality of filter assemblies spaced along a center line running from a first end of a ceiling to an opposed second end of said ceiling, said filter assemblies being in flow communication with said air inlet to said housing; and,
   a plurality of return air outlets spaced at preselected locations along opposed sides of said ceiling in flow-through communication with said air outlet from said housing.

2. The filtration system of claim 1, said filter assemblies including at least two different filters disposed in series in an air flow arrangement.

3. The filtration system of claim 2 wherein said at least two different filters includes an upstream filter being an activated charcoal impregnated filter and a downstream second filter being a high efficiency particulate filter.

4. The filtration system of claim 2 wherein one of said at least two different filters is a HEPA filter of sinuous cross-section.

5. The filtration system of claim 1, said filter assemblies including first flow-through grills flush mounted in said ceiling and said return air outlets including second flow-through grills flush mounted in said ceiling.

6. The filtration system of claim 1, said housing for a blower including an inlet air plenum chamber and an outlet air plenum chamber with said air inlet being in flow communication with said inlet air plenum chamber and said air outlet being in flow communication with said air outlet plenum chamber.

7. The filtration system of claim 1, said filter assemblies including a plenum chamber and at least one filter, said plenum chamber being downstream from said at least one filter.

* * * * *